United States Patent [19]

Foulkes et al.

[11] 3,916,309

[45] Oct. 28, 1975

[54] SHORT CIRCUIT CAPACITY MEASURING DEVICE

[75] Inventors: John F. Foulkes, Elmhurst; John S. Ferguson, Golf, both of Ill.

[73] Assignee: S&C Electric Company, Chicago, Ill.

[22] Filed: Sept. 30, 1974

[21] Appl. No.: 510,473

[52] U.S. Cl. .............................. 324/103 P; 324/102
[51] Int. Cl.² .................. G01R 19/00; G01R 29/04
[58] Field of Search ............ 324/103 P, 103 R, 102, 324/76 R

[56] References Cited
UNITED STATES PATENTS

| | | | |
|---|---|---|---|
| 1,975,065 | 9/1934 | Menger | 324/102 |
| 2,870,407 | 1/1959 | Baker | 324/102 |

*Primary Examiner*—Alfred E. Smith
*Assistant Examiner*—Ernest F. Karlsen
*Attorney, Agent, or Firm*—Kirkland & Ellis

[57] ABSTRACT

Disclosed is an electrical test instrument consisting fundamentally of a shunt capacitor for test connection to an electrical power system or circuit along with auxiliary circuits which include a control circuit to turn on at peak voltage following a manual actuation in order to allow a peak detector circuit to measure or otherwise determine the maximum instantaneous value of inrush current to the shunt capacitor from the power system, the inrush current being a function of the available short-circuit current capacity at a given location of the power system. The purpose of the instrument is to ascertain the magnitude of the short-circuit current available at any selected location on a power system and thereby select the proper short-circuit interrupting rating for a protective device such as a fuse or circuit breaker without the need for heretofore required time-consuming engineering calculations.

12 Claims, 2 Drawing Figures

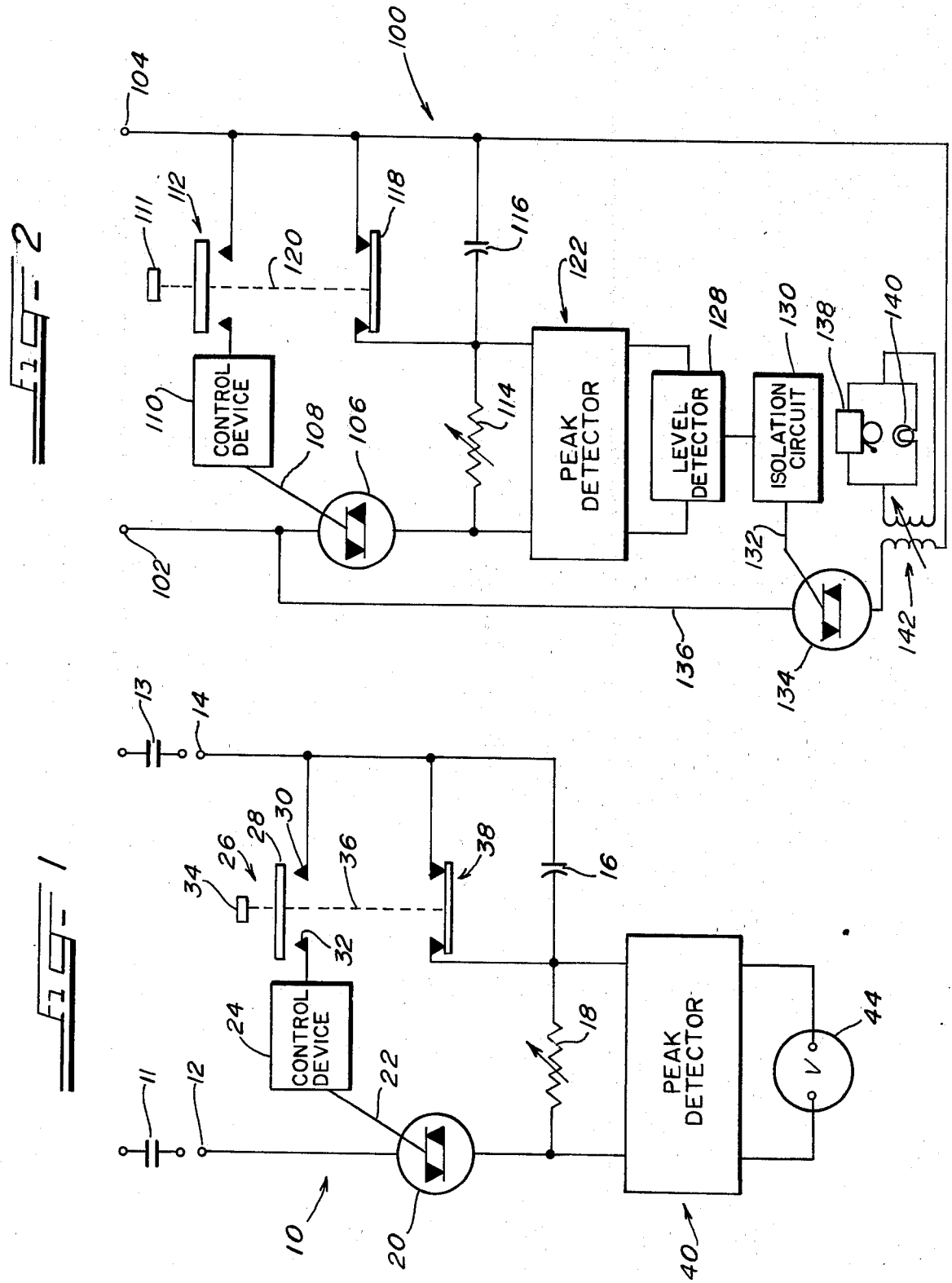

SHORT CIRCUIT CAPACITY MEASURING DEVICE

BACKGROUND OF THE INVENTION

1. Field of the Invention

The present invention relates to the measurement of short-circuit current capacity of electrical power circuits, and in particular to a device for determining the short-circuit current capacity of an electrocal power system or circuit in order to ascertain the required interrupting capacity of protective equipment.

2. Description of the Prior Art

There is presently no instrument available specifically intended for the determination of available short-circuit current levels of power systems. lThe use of peak measuring equipment, however, is not new to the art. For example, peak measuring circuits for the purpose of determining the peak current flow are illustrated in Thompson — U.S. Pat. No. 2,721,978, Park — U.S. Pat. No. 2,764,737, and Davis — U.S. Pat. No. 2,925,557. Additionally, various peak detector circuits can be found in electrical design handbooks. However, these circuits and devices, while capable of measuring peak voltage, are not intended nor suitable for measuring available short-circuit current levels in power circuits.

The requirement to determine the magnitude of available short-circuit current levels is becoming more frequent as electric utility power systems expand. Plant engineers, consulting engineers, electrical contractors, and electrical inspectors, for example, must make such determinations in order to select proper protective equipment or to verify the adequacy off existing protective equipment which may become obsolete which in use due to the growth of the utility system. Similarly, utility company engineers must match ever increasing available short-circuit current levels with heavier duty protective devices.

Presently, the determination of available short-circuit current levels requires engineering calculations which take into account circuit parameters all the way back to the generators plus such diverse and variable factors as the contribution to available short-circuit current from motors and other rotating electrical machinery and from capacitor banks which are required for voltage regulation or for power factor correction. Electrical inspectors who must enforce, for example, the National Electrical Code typically rely upon the utility company engineer for proper information upon which to base the Code requirement for protective device short-circuit interrupting ratings.

Similarly, consulting engineers and plant engineers rely upon the utility company for certain technical data. Such engineers, as well as the utility engineers, strive for accuracy in their determination of available short-circuit current levels in order to ensure adequate protection as well as to avoid the needless expense of overprotection. Therefore, an instrument for measuring available short-circuit current levels conveniently, accurately, and quickly, is a desirable advance in the art.

BRIEF SUMMARY OF THE INVENTION

The invention comprises a device for measuring directly the short-circuit current capacity at any point on an electrical power system or circuit. A capacitor is connected in series with a variable resistor and connected essentially across the line of the electrical power circuit so that capacitor inrush current, following turn-on at peak voltage, can pass through the resistor. The peak voltage drop across the resistor is measured by a peak detector means and this information is conveyed to the operator via a visual indicating means. The flow of current through the resistor-capacitor combination is controlled by an electronic switch means which is caused to shift from its normally non-conducting state to its conducting state, following manual actuation, by an internally derived control signal. A control means is used to generate and maintain the control signal so that the electronic switch means is switched to its conducting mode at peak voltage of the power system under test. The peak voltage appearing across the resistor in the resistor-capacitor combination is measured and translated into an indication of maximum available short-circuit current by an indicating means such as a voltmeter calibrated to read directly in units of available short-circuit current.

In an alternative embodiment the indicating means comprises an indicator lamp and/or an audible alarm in lieu of the voltmeter. The variable resistor is adjusted to a setting corresponding to a short-circuit current equal to the interrupting capacity rating of the existing protective equipment. The indicator lamp will light and/or the audible alarm will sound if the protective equipment is inadequate.

For application of the invention at high voltages up through ultra-high voltages such as, but not limited to, 2.4 kv through 765 kv, coupling capacitors or other suitable supplementary devices are used for connecting the instrument to the power system.

It is therefore an object of the present invention to provide an inexpensive, uncomplicated device for measuring short-circuit capacity directly thereby obviating the necessity for lengthy computations.

It is a further object of the present invention to provide a short-circuit capacity measuring device for obtaining a reliable measurement of short-circuit capacity of a circuit under examination.

It is therefore another object of the present invention to provide a short-circuit capacity measuring device for "on location" determination of compliance with electrical codes such as the National Electrical Code.

Yet another object of the present invention is to provide a short-circuit capacity measuring device capable of directly measuring short-circuit capacity for high voltage up through ultra-high voltage power systems.

These and other objects of the present invention will become readily apparent from the following description.

BRIEF DESCRIPTION OF THE DRAWINGS

FIG. 1 is a schematic circuit diagram of a preferred embodiment of the present invention.

FIG. 2 is a schematic circuit diagram of an alternative embodiment of the present invention.

DETAILED DESCRIPTION OF THE PREFERRED EMBODIMENTS

With reference to FIG. 1, measuring device 10 comprises terminals 12 and 14 for connecting device 10 to the electrical circuit to be tested (not shown). Supplementary coupling capacitors 11 and 13 of an appropriate rating may be interconnected between the terminals 12 and 14 and the electrical circuit to be tested whenever the voltage of that circuit exceeds the voltage rating of measuring device 10. Connected in series between terminals 12 and 14 are capacitor 16, variable resistor 18 and electronic switching device 20. Electronic switching device 20 preferably comprises a solid state silicon controlled rectifier or triac that can be triggered to a conducting state by application of a control signal voltage on lead 22. However, any electronic switching device capable of switching from a non-conducting state to a conducting state upon application of a control voltage will be suitable. Initially, current is not permitted to flow between terminal 12 and terminal 14 because there is no voltage applied to lead 22 of electronic switching device 20. A control device 24 is serially connected between lead 22 and switch 26. Swtich 26 comprises moving contact 28 adapted to bridge stationary contacts 30 and 32 when closed to complete a circuit from terminal 14 to control device 24. Switch 26 is operated by a manually operable push button 34 connected by operating linkage 36, generally schematically designated by a dotted line. Push button 34 may be appropriately labelled "push and hold to read". Upon depression of manually operable button 34, control device 24 is operated to provide a control signal voltage that is applied through lead 22 to electronic switching device 20 to cause it to switch from its non-conducting to its conducting state when the voltage on the circuit being tested reaches its peak value.

Manually operable push button 34 is physically linked with normally closed switch 38 by linkage 36 so that switch 38 is moved from its closed to its open position when manually operable push button 34 is depressed, linkage 36 being designed so that switch 38 opens before switch 26 is closed. The function of switch 38 will be explained below.

A peak detector 40 is connected across variable resistor 18. The peak detector 40 detects the peak voltage (IR drop) across resistor 18 caused by current flowing to charge capacitor 16. A voltmeter 44 which is calibrated in units of short-circuit current capacity (i.e., amperes, rms, symmetrical) is connected across peak detector 40. Peak detector 40 may comprise a conventional peak detector circuit appropriately adapted for utilization in measuring device 10.

As indicated above, closing of switch 26 initiates operation of control device 24, which in turn causes switching device 20 to switch to its conducting state when the voltage on the circuit being tested reaches its peak value, so that resistor 18 and charging capacitor 16 are across the line of the high voltage circuit connected to terminals 12 and 14, and charging capacitor 16 is allowed to charge through resistor 18.

Control device 24, operates to turn on the electronic switching device 20 as the voltage on the circuit being tested reaches maximum or peak value. Control device 24 may comprise any conventional timing circuit whose operation is initiated by a conventional zero-crossing detector so that the timing circuit starts timing when the voltage in the ac circuit being tested crosses the zero axis. The timing circuit is set to initiate the control signal to the electronic switching device 20 approximately 4 milliseconds (one-fourth cycle at 60 cycles per second) after zero crossing so that the electronic switching device 20 switches to its conducting state as the maximum or peak voltage of the circuit being tested is reached. The timing circuit and the zero crossing detector may be any of a number of conventional well known circuits adapted for use in measuring device 10 to cause electronic switching device 20 to switch to a conducting condition when peak voltage occurs on the circuit under test.

Alternatively, control device 24 may comprise a conventional phase shifting circuit that generates a 90° out-of-phase signal having a zero crossing point coinciding with the peak voltage in the circuit being tested. A conventional zero crossing detector can be used to sense the zero crossing of the out-of-phase signal to initiate the control signal to the electronic switching device 20 so that the electronic switching device 20 switches to its conducting state as the maximum or peak voltage of the circuit being tested is reached. The phase shifting circuit and zero crossing detector may be any conventional well known circuits adapted for use in measuring device 10.

Control device 24 is not required to fulfill an automatic turn-off function, since the impedance of capacitor 16 is sufficiently high to limit steady-state current to a relatively low value until manual release of button 34 which actuates control device 24 to turn off solid-state switch 20 prior to contact make of switch 38. Switch 38 is normally closed when button 34 is not depressed so that any charge on capacitor 16 remaining from a prior test is discharged so that capacitor 16 has no charge on it when testing is initiated and electronic switching device 20 switches to its conducting state.

Peak detector 40 is preferably a solid-state peak detector circuit which detects the peak voltage (IR drop) across resistor 18 and provides a voltage signal to meter 44 representative of the peak voltage (IR drop) across resistor 18. The peak capacitor inrush current that products the peak voltage (IR drop) across resistor 18 is a direct function of the short-circuit current capacity of the circuit connected between terminals 12 and 14. The applicable equation for determining the short-circuit current capacity is as follows:

$Ip = \sqrt{2} \sqrt{I_{ss} \cdot I_{sc}}$ where $Ip$ = peak current through resistor 18 and capacitor 16; $I_{ss}$ = steady state rms current through resistor 18 and capacitor 16; $I_{sc}$ = rms, symmetrical short-circuit current capacity of the circuit being tested. Thus, $I_{sc}$ is a function of the peak voltage drop across resistor 18 as follows:

$$I_{sc} = \frac{Ep^2}{2R^2 I_{ss}}$$

where $EP$ = peak voltage drop across the resistor having R ohms resistance. This equation remains accurate for any series resistor 18 having a resistance value that is small in relation to the impedance of the circuit being tested. Accordingly, the voltage signal provided by peak detector 40, and measured by meter 44, is a direct function of the short-circuit current capacity of the circuit being tested, and meter 11 can be calibrated to read directly in appropriate units of short-circuit current capacity (i.e., amperes, rms, symmetrical). Variable resistor 18 can be adjusted to facilitate calibration of measuring device 10.

FIG. 2 illustrates an alternative embodiment of the subject invention which may be used as a means of indicating when a pre-established short-circuit capacity limit is exceeded by the circuit under test rather than as a means of determining the exact short-circuit current capacity.

In FIG. 2, measuring device 100 comprises terminals 102 and 104 connected across the line of the circuit under test. Connected in series between terminals 102 and 104 are charging capacitor 116, variable resistor 114, and electronic switching device 106. Electronic switching device 106 preferably comprises a solid-state silicon controlled rectifier or triac that can be triggered to a conducting condition by the application of a control signal voltage on lead 108. However, any electronic switching device capable of switching from a non-conducting state to a conducting state upon application of a control signal voltage will be suitable. A control device 110 is connected to lead 108 and switch 112 is serially connected between terminal 104 and control device 110. Connected across capacitor 116 is switch 118. Switch 118 is normally closed and is connected to switch 112 by linkage 120 schematically represented by a dotted line so that switch 118 is opened before switch 112 is closed when button 111 is depressed.

Connected across resistor 114 is peak detector 122. Peak detector 122 may be any conventional well known peak detector circuit capable of detecting peak voltage across resistor 114 adapted for use in measuring device 100.

Connected across peak detector 122 is level detector 128. Level detector 128 may be any conventional well known level detecting circuit capable of detecting when peak detector 122 has detected a voltage above a predetermined level adapted for use in measuring device 100. Connected to level detector 128 is isolation circuit 130. Isolation circuit 130 is connected by lead 132 to electronic switching device 134 capable of switching from a nonconducting state to a conducting state when a control signal voltage is applied on lead 132. Isolation circuit 130 may be any conventional isolation circuit adapted for use in measuring device 100.

Electronic switching device 134 is connected on one side to terminal 102 by lead 136, and is connected on its opposite side to the primary winding of variable transformer 142. Connected across the secondary winding of variable transformer 142 is the parallel combination of audible alarm bell 138 and indicator lamp 140.

The second embodiment of the present invention simplifies the use of the test instrument by substituting a signalling system, comprising indicator lamp 140 and audible alarm bell 138 for the voltmeter 44 in FIG. 1. Level detector circuit 128 produces a signal to turn on electronic switching device 134 through isolation circuit 130. Isolation circuit 130 provides for conversion from the level detector 128 output signal voltage to the triggering control signal voltage required for turn-on of electronic switching device 134. Variable resistor 114 provides a means for external adjustment of the instrument so that electronic switching device 134 can be made to switch to conducting state when the peak inrush current to capacitor 116 exceeds a predetermined value. Variable transformer 142 provides a means for deriving a voltage from the circuit being tested which will match the voltage rating of audible alarm bell 138 and indicator lamp 140.

Operation of measuring device 100 is substantially the same as measuring device 10 (FIG. 1). Control device 110 operates in the same manner upon closing of switch 112 to provide a control signal voltage to switching device 106 as peak voltage is reached. Capacitor 116 then charges and a peak voltage drop is developed across resistor 114 that can be detected by peak detector 122. However, in the FIG. 2 embodiment, variable resistor 114 can be adjusted so that the peak voltage across resistor 114 will only be large enough to trigger level detector 128 if the short-circuit current capacity of the circuit being tested exceeds a previously established upper limit. For example, if the existing protective equipment, such as a circuit breaker, has an interrupting rating of 5000 amperes, rms, symmetrical, resistor 114 can be adjusted so that if the peak voltage drop across resistor 114 during testing exceeds a value representative of 5000 amperes short-circuit capacity, level detector 128 will operate to provide a control signal voltage through isolation circuit 130 to cause switching device 134 switch thereby lighting indicator lamp 140 and causing audible alarm 138 to sound.

If a peak voltage is developed across resistor 114 that is representative of a short-circuit capacity below the rating of the protective equipment, electronic switching device 134 will not be switched to a conducting state, and no audible or visual signal will be initiated.

The FIG. 2 embodiment provides a simple "go - no go" type of test apparatus that can be used to determine whether the short-circuit current capacity of the circuit under test exceeds a preselected value. Variable resistor 114 can have an appropriate calibrated dial so that the tester can select the appropriate current level before testing, so that the device can be used to measure a variety of circuits. Alternatively, resistor 114 could be factory set so that no means of adjustment in the field is provided so that the measuring device 100 could be used to test various circuits with respect to only one value of short-circuit capacity.

It should be understood that various modifications could be made to the present invention the preferred embodiment of which is shown in FIG. 1, and the alternative embodiment of which is illustrated in FIG. 2, without departing from the spirit and scope of this invention as defined in the appended claims.

We claim:
1. A device for measuring the short-circuit current capacity at any location on an electrical power circuit comprising:
   a capacitor;
   a resistor connected in series combination with said capacitor, said series combination of said capacitor and said resistor having a first terminal and a second terminal, said series combination of said capacitor and said resistor being connected by said first terminal and said second terminal across the line of the electrical power circuit;
   peak detector means connected across said resistor for detecting the peak voltage drop across said resistor;
   indicating means connected to said peak detector for indicating the short-circuit current capacity of the circuit under test corresponding to the peak voltage drop across resistor detected by said peak detector means;
   electronic switch means connected in series between said first terminal and said resistor, said electronic switch means having a non-conducting state for preventing current flow through said combination of said resistor and said capacitor, and said electronic switch means capable of switching to a conducting state to permit current to flow from said first terminal to said second terminal through said combination of said resistor and said capacitor in response to receipt of a control signal;

control means for providing a control signal to said electronic switch means in response to external operator initiation thereby causing said electronic switch means to switch from its non-conducting state to its conducting state at the peak voltage of the electrical power circuit.

2. A device for measuring short-circuit current capacity as claimed in claim 1, wherein said control means comprises a zero crossing detector means for detecting when the voltage of said electrical power circuir crosses the zero axis following external operator initiation and a timing means for providing a control signal to said electronic switch means at approximately one-fourth of the cycle of voltage wave form in said electrical power circuit after the voltage of said electrical circuit crosses the zero axis.

3. A device for measuring short-circuit current capacity as claimed in claim 2 wherein said timing means provides said control signal to said electronic switch means 4 milliseconds after the voltage of said electrical circuit crosses the zero axis.

4. A device for measuring short-circuit current capacity as claimed in claim 1 wherein said control means comprises:

a phase shifting means for shifting the voltage on the circuit 90° out of phase;

a zero crossing detector means for detecting and providing a control signal to the electronic switch means when the 90° out-of-phase signal crosses the zero axis.

5. A device for measuring short-circuit current capacity as claimed in claim 1 wherein said electronic switch means comprises a silicon controlled rectifier.

6. A device for measuring short-circuit current capacity as claimed in claim 1 wherein said electronic switch means comprises a triac.

7. A device for measuring short-circuit current capacity as claimed in claim 1 wherein said indicator means comprises an electrical meter for measuring the peak voltage across said resistor detected by said peak detector means and visually indicating the corresponding short-circuit current capacity of the electrical circuit.

8. A device for measuring short-circuit current capacity as claimed in claim 1 wherein said indicating means comprises:

a second electronic switch means connected to said first terminal;

a level detector means connected to said peak detector for detecting when the peak voltage level detected by said peak detector exceeds a pre-determined level;

an isolation circuit means connected to said level detector for providing a control signal to said second electronic switch means for causing said electronic switch means to switch from its non-conducting state to its conducting state when the level detector means detects a peak voltage level that exceeds the pre-determined level; and an indicator lamp electrically connected to said second electronic switch means and to the second terminal so that said indicator lamp will light when the second electronic switch means switches to its conducting state.

9. A device for measuring short-circuit current capacity as claimed in claim 8 further comprising an audible alarm electrically connected to said second electronic switching device for providing an audible alarm when said second electronic switching device switches to its conducting state.

10. A device for measuring short-circuit current capacity as claimed in claim 1 further comprising switch means for discharging said capacitor after said electronic switch means switches to its non-conducting state.

11. A device for measuring short-circuit current capacity as claimed in calim 1 wherein said resistor can be adjusted to vary the resistance of said resistor.

12. A device for measuring short-circuit current capacity as claimed in claim 9 wherein said indicator lamp and said audible alarm are electrically connected to said second electronic switching device by a variable transformer.

* * * * *